United States Patent [19]
Sealey

[11] Patent Number: 5,944,161
[45] Date of Patent: Aug. 31, 1999

[54] END CAP ASSEMBLY FOR A ROLLER TUBE OF A CONVEYOR ROLLER

[75] Inventor: Derek Alfred Sealey, Padbury, Australia

[73] Assignee: JVL Industries Pty Ltd, Mayaree, Australia

[21] Appl. No.: 08/849,863

[22] PCT Filed: Nov. 15, 1995

[86] PCT No.: PCT/AU95/00758

§ 371 Date: May 29, 1997

§ 102(e) Date: May 29, 1997

[87] PCT Pub. No.: WO96/16884

PCT Pub. Date: Jun. 6, 1996

[30] Foreign Application Priority Data

Dec. 1, 1994 [AU] Australia ............................. PM9791

[51] Int. Cl.⁶ .................................................. B65G 13/00
[52] U.S. Cl. .................................................. 193/37
[58] Field of Search ..................................... 193/37

[56] References Cited

U.S. PATENT DOCUMENTS

| | | |
|---|---|---|
| 2,757,988 | 8/1956 | Lecourbe . |
| 3,610,387 | 10/1971 | Sealey . |
| 4,272,135 | 6/1981 | Hamblin et al. ................... 193/37 X |
| 4,852,230 | 8/1989 | Yu ...................................... 193/37 X |
| 5,642,800 | 7/1997 | East .......................................... 193/37 |

FOREIGN PATENT DOCUMENTS

| | | |
|---|---|---|
| 36602/68 | 4/1968 | Australia . |
| 70620/74 | 1/1976 | Australia . |
| B1-40008/78 | 3/1980 | Australia . |
| A-35194/93 | 9/1994 | Australia . |
| A-60741/94 | 3/1995 | Australia . |
| 258568 | 3/1988 | European Pat. Off. ............. 193/37 |
| 239428 | 10/1945 | Switzerland ........................ 193/37 |
| 2 030 659 | 4/1980 | United Kingdom . |
| 1 591 194 | 6/1981 | United Kingdom . |

*Primary Examiner*—James R. Bidwell
*Attorney, Agent, or Firm*—Merchant, Gould, Smith, Edell, Welter & Schmidt

[57] ABSTRACT

An end cap assembly (10) for a roller tube (76) of a conveyor roller (78) comprising an end cap body (12) proportioned to press fit within an end of the roller tube (76), a bearing retained between the end cap body (12) and a shaft (74) of the conveyor roller (78) and a seal (16) provided about the shaft (74) and abutting an outer surface (18) of the end cap body (12) so as to restrict the passage of dust and other materials into the bearing (14).

16 Claims, 4 Drawing Sheets

END CAP ASSEMBLY FOR A ROLLER TUBE OF A CONVEYOR ROLLER

FIELD OF THE INVENTION

THIS INVENTION relates to an end cap assembly for a roller tube of a conveyor roller. More particularly, the end cap assembly is of the form incorporating bearings for rotatably mounting the end cap and a roller tube on a shaft.

DISCUSSION OF THE PRIOR ART

At present, end cap assemblies for idler rollers comprise a large number of component parts, possibly 24 separate parts in some instances. Typical end cap assemblies also have problems associated with vibration or conveyor rattle which can be transferred by the steel casing of the roller bearings in the end cap assembly and in turn to a shaft held therein. Such vibration is known to have a peening effect on the shaft which is undesirable.

A further consequence of the vibration or conveyor rattle is noisy operation. A still further problem associated with the prior art is the need for establishing and maintaining an effective seal in the end cap assembly against dust entering the bearing or the roller.

The end cap assembly for a roller tube of a conveyor roller has as one object thereof to substantially overcome the above problems associated with the prior art.

BRIEF DESCRIPTION OF THE INVENTION

In accordance with the present invention there is provided an end cap assembly for a roller tube of a conveyor roller characterised by comprising an end cap body proportioned to press fit within an end of the roller tube, a bearing means retained between the end cap body and a shaft of the conveyor roller and a seal means provided about the shaft and abutting an outer surface of the end cap body so as to restrict the passage of dust and other materials into the bearing means, the end cap body having an inner collar portion arranged so as to abut in a flexible and resilient manner the shaft of the conveyor roller projecting therethrough, the bearing means further being retained between the end cap body and the shaft of the conveyor roller at least in part by way of an annular retaining means that is fitted to the end cap body to hold the bearing means between it and the inner collar portion of the end cap body.

Preferably, the seal means is press fitted about the shaft whereby upon rotation thereof the seal means rotates with respect to the end cap body.

In accordance with another aspect of the present invention there is provided a method for the refurbishment of an existing roller tube of a conveyor roller characterised by comprising the steps of cutting the existing roller tube around its circumference adjacent an end cap thereof, removing the end cap assembly and replacing same with an end cap assembly comprising an end cap body proportioned to press fit within the cut end of the roller tube, a bearing means retained between the end cap body and a shaft of the conveyor roller tube such that an outer race thereof moves with the end cap body and its inner race moves with the shaft and a seal means press fitted about the shaft and abutting an outer surface of the end cap body.

Preferably, the seal means rotates with the shaft and abuts flexibly and resiliently the outer surface of the end cap body in a sliding manner.

Still preferably, the end cap body contains at least one aperture therein allowing passage of fluid from within the roller tube through the end cap body.

DESCRIPTION OF THE DRAWINGS

The present invention will now be described, by way of example only, with reference to one embodiment thereof and the accompanying drawings, in which.

DESCRIPTION

Figure 5:
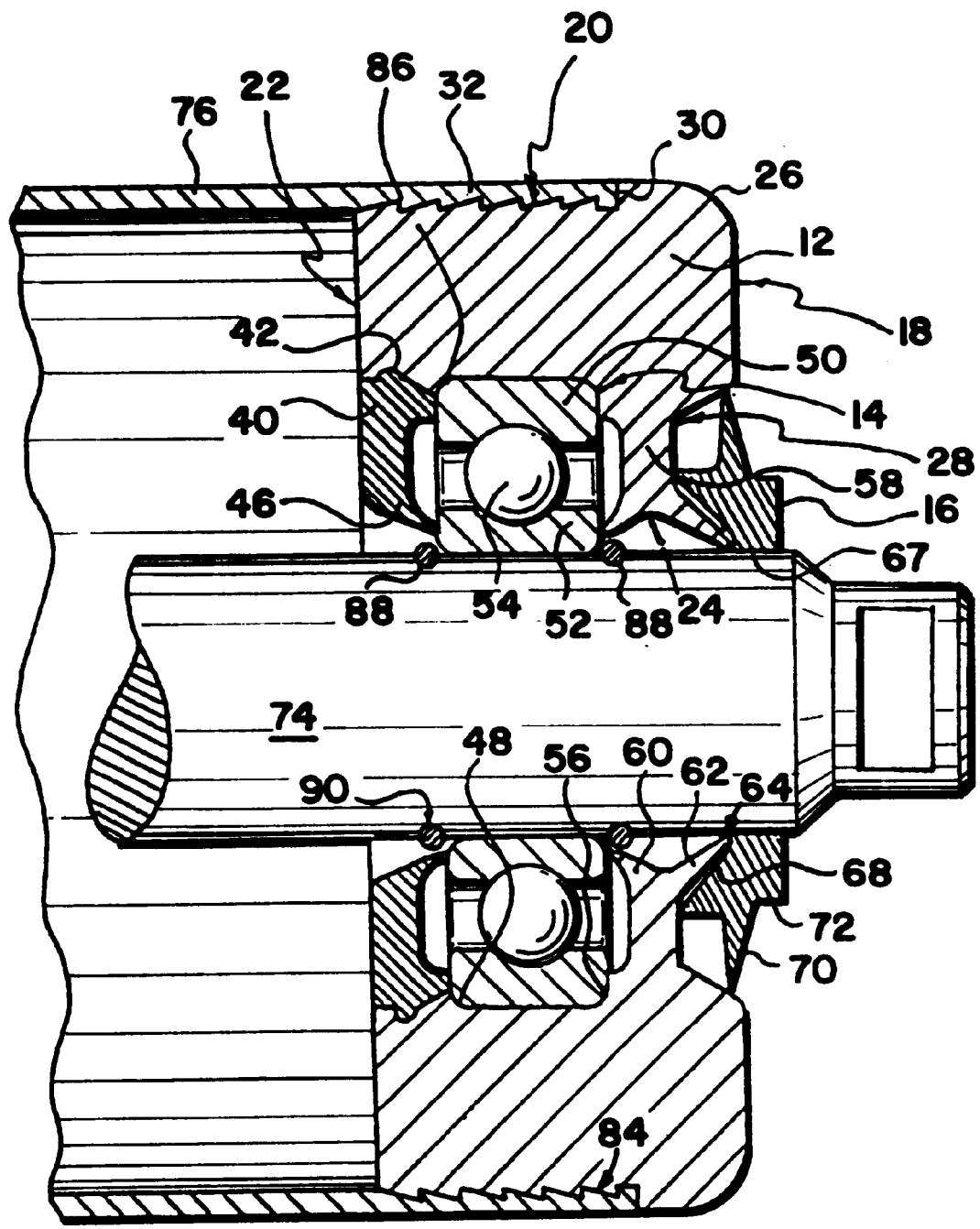
FIG. 5 is a cross-sectional view of an end cap assembly of the present invention fitted to an end of a conveyor roller.
Figure 6:
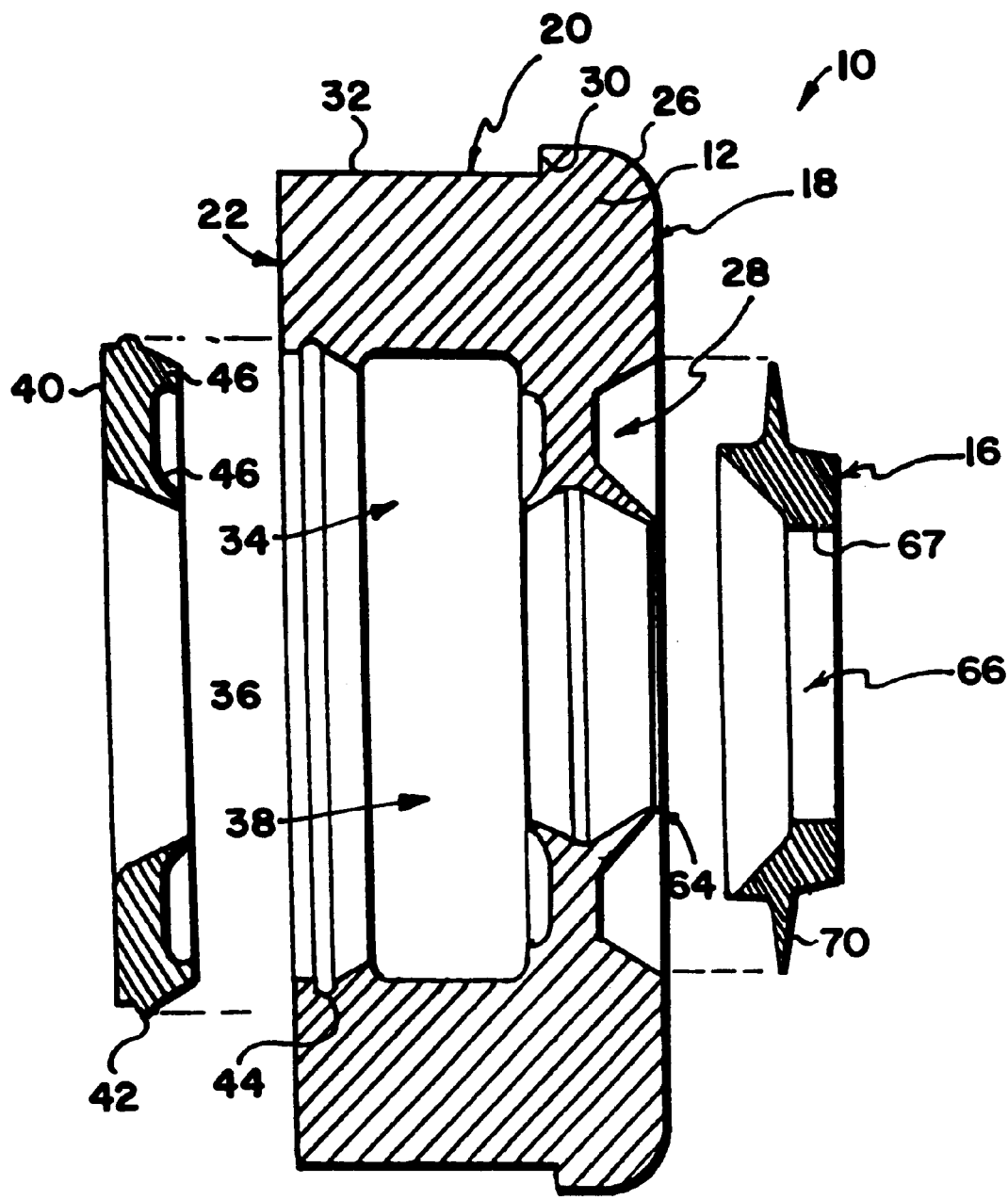
FIG. 6 is an exploded cross-sectional view of the end cap assembly of FIG. 5, having the bearing means removed therefrom.

In FIGS. 5 and 6 there is shown an end cap assembly 10 comprising an end cap body 12 of generally annular configuration, a bearing means 14 and an annular seal means, for example an annular seal ring 16.

The end cap body 12 comprises an outer surface 18, a recessed peripheral surface 20, an inner surface 22 and an inner collar portion 24. The outer surface 18 has a smooth outer edge 26 and a central annular channel 28. The peripheral surface 20 has a shoulder 30 provided therein between the smooth edge 26 and a substantially flat face 32.

The inner surface 22 is substantially flat but has provided therein a recess 34. The recess 34 forms two sealing portions 36 and 38 in which a retaining means 40 and the bearing means 14 respectively are located, as best seen in FIG. 6.

The retaining means 40 is provided in the form of an annular ring and having provided thereon a raised rib 42 to provide positive location thereof in a complimentary recess 44 of the sealing portion 36. A pair of annular arms 46 extend outwardly from the retaining means 40. The sealing portions 36 and 38 are separated by a shoulder 48 against which the retaining means 40 is held but over which the bearing means 14 may pass.

The bearing means 14 comprises an outer race 50, an inner race 52 and a single row of ball bearings 54 held therebetween in known manner. The arms 46 of the retaining means 40 abut resiliently and flexibly the inner race 52 and the outer race 50.

The inner collar portion 24 of the end cap body 12 comprises an inner shoulder 56 and a neck portion 58 projecting therefrom and in part defined by the channel 28. The neck portion 58 has a pair of arms 60 and 62 projecting therefrom. The arm 60 projects inwardly and abuts the inner race 52 of the bearing means 14. The outer race 50 abuts the inner shoulder 56. The arm 62 projects outwardly but away from the neck portion 58. The arm 62 defines the narrowest aperture 64 of the substantially annular end cap body 12.

The annular seal ring 16 has an aperture 66 described by a central surface 67. A recessed inner surface describes an angled shoulder 68. A peripheral flange 70 extends from a peripheral face 72 of the ring 16. The flange 70 flexibly abuts the channel 28. The central surface 67 is press fitted over a shaft 74 whereas the flat face 32 of the peripheral surface 20 is press fitted within a roller tube 76. The shoulder 30 of the peripheral surface 20 abuts an outer end of the roller tube 76. The space defined between the arms 60 and 62 and the shaft 74 contains a quantity of grease for lubrication. A further quantity of grease is provided in the space defined by the arm 60, the bearing means 14 and the neck portion 58, also for lubrication purposes. A still further quantity of grease is provided in the space defined by the angled shoulder 68 and the neck portion 58. In addition to the lubrication of the bearing means 14 and the various seals created by the arms 60 and 62 and the angled shoulder 68 the grease acts to trap and prevent the ingress of dust.

The inner race 52 of the bearing means 14 is held in position on the shaft 74 through the use of an industrial adhesive in combination with a pair of circlips 88 provided adjacent thereto. The circlips 88 are located in a pair of channels 90 about the shaft 74. It is envisaged that the pair of circlips 88 be provided at one end only of the shaft 74.

An inner surface 84 of the conveyor roller 78 has provided thereabout a number of annular barbs 86. The flat face 32 of the peripheral surface 20 is able to deform and be held in position on the roller 78. The barbs 86 are oriented to prevent the end cap body 12 pulling free of the roller 78.

Figure 1:
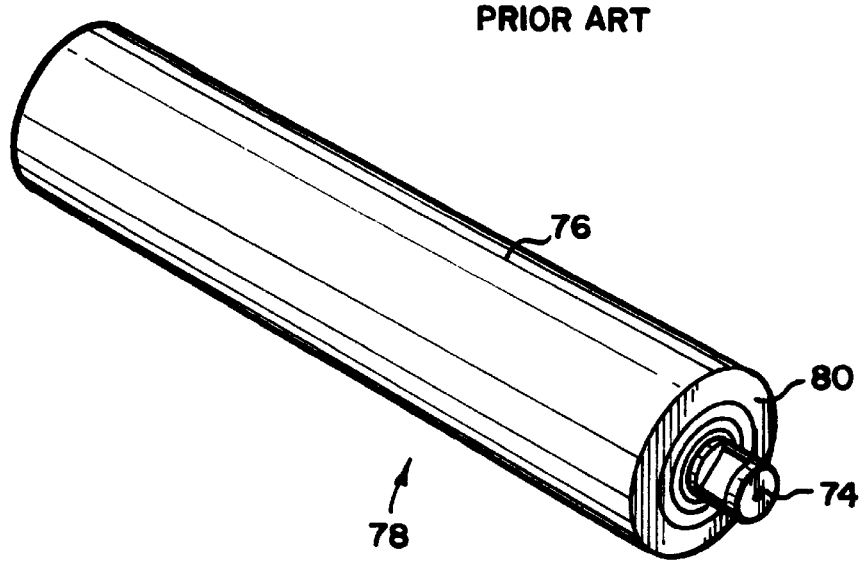
FIG. 1 is a perspective view of an unmodified conveyor roller having a prior art end cap assembly fitted thereto.
Figure 2:
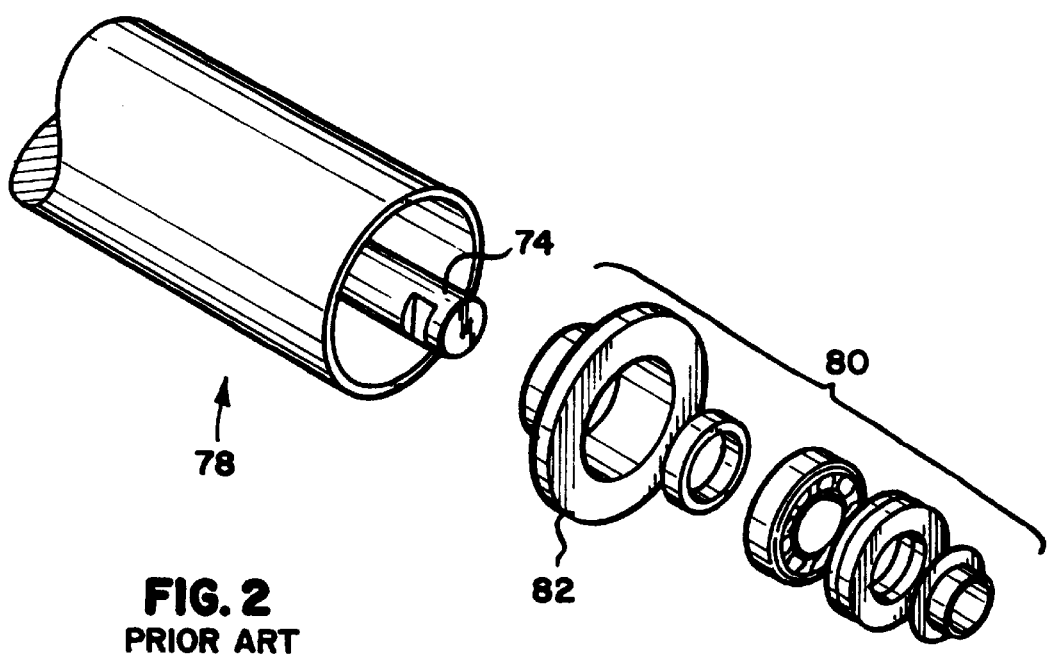
FIG. 2 is a perspective view of the conveyor roller of FIG. 1 after having the roller tube thereof cut about its circumference and having the end cap assembly removed from about the shaft.

In FIG. 1 there is shown the roller tube 76 of a conveyor roller 78 having a prior art end cap assembly 80 fitted about the shaft 74. In FIG. 2 there is shown the end cap assembly 80 exploded into its various components. Further, a portion 82 of the roller tube 76 adjacent the end cap assembly is shown cut away about the circumference of the roller tube 76.

Figure 3:
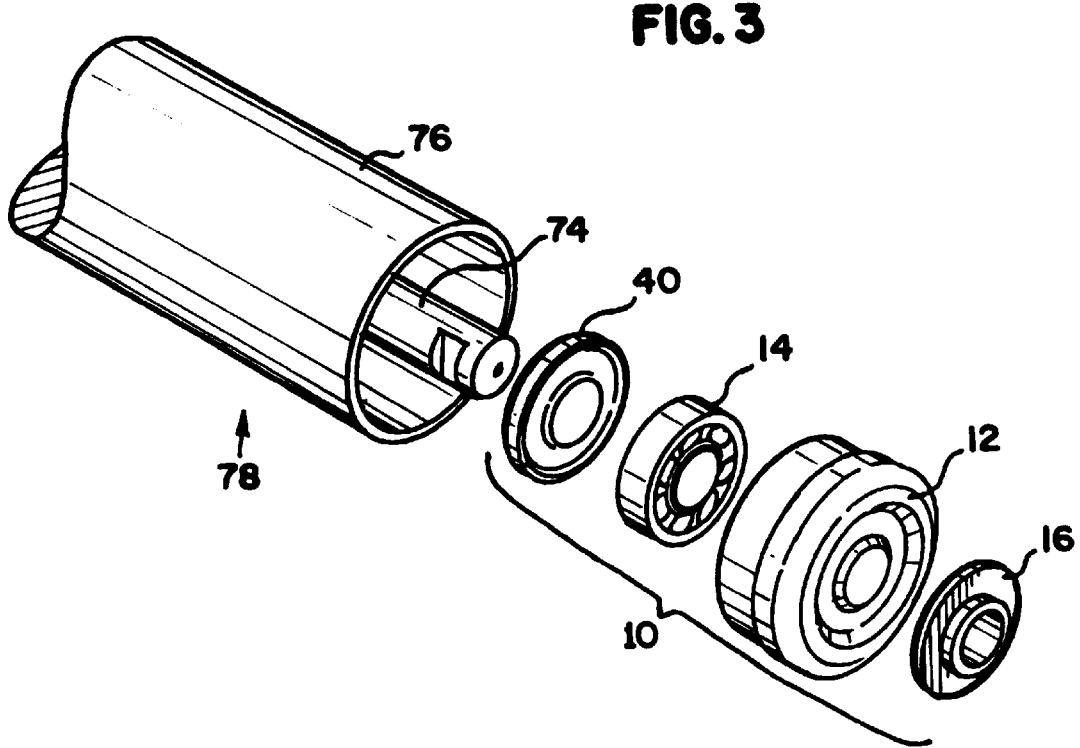
FIG. 3 is an exploded perspective view of the conveyor roller of FIG. 2 to which an end cap assembly in accordance with the present invention is being fitted.
Figure 4:
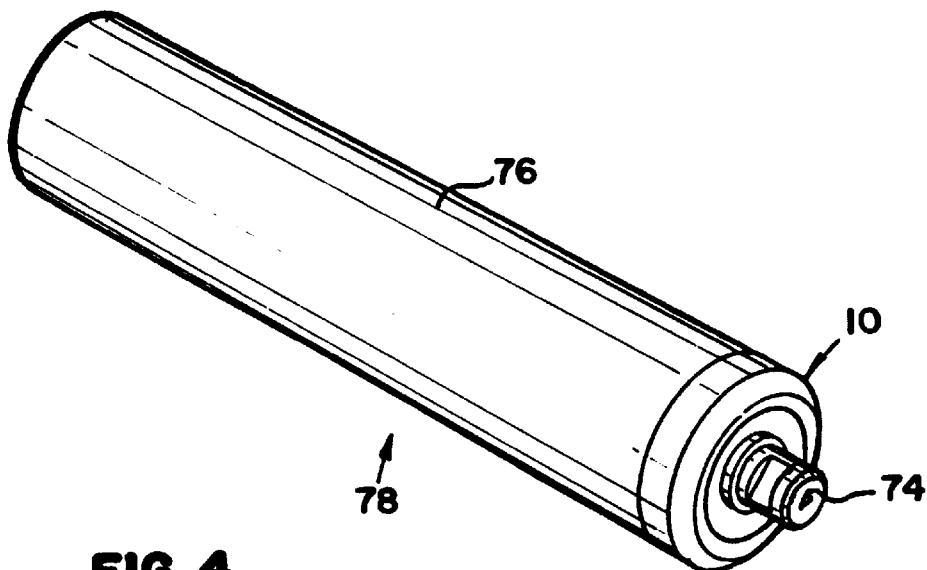
FIG. 4 is a perspective view of the conveyor roller of FIG. 2 to which an end cap assembly of the present invention has been fitted.

In FIGS. 3 and 4 there is shown the fitting of the end cap assembly 10 of the present invention to the conveyor roller 78.

In use, the end cap assembly 10 of the present invention operates by allowing the end cap body 12 to rotate with relation to the shaft 74 through the action of the bearing means 14. The inner race 52 of the bearing means 14 is fitted to the shaft 74 and held by an appropriate industrial adhesive. As such, the roller tube 76 to which the end cap body 12 is fitted may rotate with respect to the shaft 74 as is required in the normal operation of the conveyor roller 78.

As has been noted above, the retaining means is held within the seating portion 36 thereby positively locating the bearing means 14 within the seating portion 38 against the shoulder 56 and arm 60 of the end cap body 12. The annular seal ring 16 is press fitted through central surface 67 to the shaft 74 whereby the angled shoulder 68 and the peripheral flange 70 thereof form a flexible and rotatable seal against the channel 28 of the outer surface 18 of the end cap body 12.

The arm 62 of the neck portion 58 of the end cap body 12 forms a flexible rotatable seal against the shaft 74, as can be best seen in FIG. 6. This feature in combination with the action of the seal ring 16 and the action of the arm 60 of the neck portion 58 serves to prevent dust and other foreign material entering into the bearing means 14. In addition, the retaining means 40 and its positive location of the bearing means 14 through the action of arms 46 serves also to prevent material entering the bearing means 14 from the inside of the conveyor roller 78.

It is envisaged that each of the end cap body 12, the seal ring 16 and the retaining means 40 may be formed of a polyurethane thereby making the end cap assembly 10 particularly light but also providing the arms 46, the arms 60 and 62, and the flange 70 with a particular degree of resilience and flexibility allowing a degree of resilience to be exercised in the creation of the various sealing effects within the end cap assembly 10 of the present invention.

The refurbishment of an existing conveyor roller 78 is achieved by the cutting of the roller tube 76 at a point along its circumference adjacent the existing end cap assembly 80, as can be seen in FIGS. 1 and 2. Once this laser cutting step has been completed the end cap assembly 80 is removed from the shaft 74, as is seen specifically in FIG. 2. The end cap assembly 10 of the present invention may then be fitted about the shaft 74 and the end cap body 12 press fitted within the roller tube 76, as is shown in FIG. 5.

The bearings and the shaft of a conveyor roller 78 are consequently able to be serviced. Further, the polyurethane material used in the construction of the end cap assembly 10 absorbs a large proportion of the vibration or conveyor rattle which may be transferred from the roller tube 76 to the bearing means 14 and the shaft 74 thereby causing a peening effect. There is also a consequent reduction in the level of sound or noise produced during normal operation of the roller conveyor 78.

The provision of the smooth edge 26 to the end cap body 12 and effectively to the roller tube 76 is advantageous in that it prevents unnecessary wear on a conveyor belt running on the roller tube 76. It is envisaged that a breather hole or aperture (not shown) may be provided in the end cap body 12 passing from the inner surface 22 to the outer surface 18 thereof. This breather hole will allow the passage of condensed fluid from within the conveyor roller 78 to drain therefrom. It is further envisaged that the two end cap assemblies 10 required on each conveyor roller 78 may be coloured differently to indicate which thereof has provided therein the breather hole. Only that situated at the lower end of the conveyor roller 78 will require the breather hole.

The end cap assembly 10 of the present invention provides an end cap assembly comprising far less components than that of the prior art with a number of integral dust seals and which further allows refurbishment of existing conveyor rollers 78.

Modifications and variations such as would be apparent to the skilled addressee upon a reading of the specification are considered to fall within the scope of the present invention.

I claim:

1. An end cap assembly for a roller tube of a conveyor roller characterised by comprising an end cap body proportioned to press fit within an end of the roller tube, a bearing means retained between the end cap body and a shaft of the conveyor roller and a seal means provided about the shaft and abutting an outer surface of the end cap body so as to restrict the passage of dust and other materials into the bearing means, the end cap body having an inner collar portion arranged so as to abut in a flexible and resilient manner the shaft of the conveyor roller projecting therethrough, the bearing means further being retained between the end cap body and the shaft of the conveyor roller at least in part by way of an annular retaining means that is fitted to the end cap body to hold the bearing means between it and the inner collar portion of the end cap body.

2. An end cap assembly according to claim 1, characterised in that the seal means is press fitted about the shaft whereby upon rotation thereof the seal means rotates with respect to the end cap body.

3. An end cap assembly according to claim 1, characterised in that the end cap body has a generally annular form.

4. An end cap assembly according to claim 1, characterised in that the retaining means comprises in part a raised rib and a pair of annular arms projecting therefrom, the rib being proportioned for snap fitting engagement with the end cap body and the arms being proportioned to each resiliently and flexibly engage one of either an inner or outer race of the bearing means.

5. An end cap assembly according to claim 1, characterised in that the end cap body has an outer surface in which is defined an annular channel, the seal means projecting at least in part into the channel.

6. An end cap assembly according to claim 1, characterised in that the seal means is provided in the form of an annular seal ring having at least one shoulder or flange flexibly abutting the end cap body.

7. An end cap assembly according to claim 1, characterised in that the end cap body comprises in part a recessed peripheral surface for receiving thereon the roller tube.

8. An end cap assembly according to claim 4 characterised in that the bearing means is located in a recess adjacent the inner collar portion of the end cap body and against an inner shoulder and an arm thereof such that the shoulder abuts the outer race of the bearing means and the arm abuts the inner race of the bearing means.

9. An end cap assembly according to claim 8, characterised in that the inner collar portion of the end cap body defines in part a neck portion having a pair of arms projecting therefrom, one of these arms abutting the inner race of the bearing means whilst the other arm abuts the shaft of the conveyor roller.

10. An end cap assembly according to claim 9, characterised in that a space defined between the arms of the neck portion and the shaft of the conveyor roller contains a quantity of grease to provide lubrication and a further barrier against dust entering the bearing means.

11. An end cap assembly according to claim 6, characterised in that a space is defined between the shoulder or flange of the seal means and the end cap body, the space containing a quantity of grease to provide lubrication and a further barrier against dust entering the bearing means.

12. An end cap assembly according to claim 1 characterised in that the bearing means is provided in the form of a single row roller bearing.

13. An end cap assembly according to claim 1, characterised in that the end cap body contains at least one aperture therein to allow passage of fluid from within the roller tube through the end cap body.

14. An end cap assembly according to claim 1, characterised in that an inner surface of the end of the roller tube receiving the end cap body is provided with at least one annular barb, the annular barb acting to prevent the end cap body pulling free of the roller tube.

15. A method for the refurbishment of an existing roller tube of a conveyor roller characterised by comprising the steps of cutting the existing roller tube around its circumference adjacent an end cap thereof, removing the end cap assembly and replacing same with an end cap assembly comprising an end cap body proportioned to press fit within the cut end of the roller tube, a bearing means retained between the end cap body and a shaft of the conveyor roller tube such that an outer race thereof moves with the end cap body and its inner race moves with the shaft and a seal means press fitted about the shaft and abutting an outer surface of the end cap body, the end cap body having an inner collar portion arranged so as to abut in a flexible and resilient manner the shaft of the conveyor roller projecting therethrough, the bearing means further being retained between the end cap body and the shaft of the conveyor roller at least in part by way of an annular retaining means that is fitted to the end cap body to hold the bearing means between it and the inner collar portion of the end cap body.

16. A method according to claim 15, characterised in that the seal means is fixed with respect to the shaft of the conveyor roller and abuts flexibly and resiliently the outer surface of the end cap body in a sliding manner.

* * * * *

UNITED STATES PATENT AND TRADEMARK OFFICE
CERTIFICATE OF CORRECTION

PATENT NO. : 5,944,161

DATED : August 31, 1999

INVENTOR(S) : Sealey

It is certified that error appears in the above-identified patent and that said Letters Patent is hereby corrected as shown below:

On the title page,
Item [73], under the Assignee, please delete "JVL" and insert —JLV—.

Signed and Sealed this

Twenty-third Day of January, 2001

Attest:

Q. TODD DICKINSON

*Attesting Officer*       *Commissioner of Patents and Trademarks*

UNITED STATES PATENT AND TRADEMARK OFFICE
CERTIFICATE OF CORRECTION

PATENT NO. : 5,944,161

DATED : August 31, 1999

INVENTOR(S) : Sealey

It is certified that error appears in the above-identified patent and that said Letters Patent is hereby corrected as shown below:

On the title page: Item

At [73], under the Assignee, please delete "JVL" and insert —JLV—.

At [73], under the Assignee, please delete "Mayaree" and insert —Myaree—.

Signed and Sealed this

Thirteenth Day of March, 2001

NICHOLAS P. GODICI

*Attest:*

*Attesting Officer*  *Acting Director of the United States Patent and Trademark Office*